United States Patent [19]

Radovich et al.

[11] Patent Number: 4,546,12?

[45] Date of Patent: Oct. 8, 198!

[54] FLEXIBLE POLYURETHANE FOAMS

[75] Inventors: David A. Radovich, Imperial, Pa.; Michael K. Lowery, Moundsville, W. Va.

[73] Assignee: Mobay Chemical Corporation, Pittsburgh, Pa.

[21] Appl. No.: 638,325

[22] Filed: Aug. 6, 1984

[51] Int. Cl.$^4$ ............... C08G 18/14; C08G 18/64; C08G 18/32
[52] U.S. Cl. ..................... 521/164; 521/127; 521/129; 521/110; 521/51; 521/113; 521/114; 521/131; 521/133; 521/130; 521/137; 521/904
[58] Field of Search ............ 521/164, 904, 137

[56] References Cited

U.S. PATENT DOCUMENTS

| Re. 28,715 | 2/1976 | Stamberger | 260/33.2 R |
|---|---|---|---|
| Re. 29,118 | 1/1977 | Stamberger | 260/2.5 BE |
| 3,026,275 | 3/1962 | Mueller et al. | 521/174 |
| 3,049,515 | 8/1962 | Damusis | 260/77.5 |
| 3,054,778 | 9/1962 | Honea et al. | 260/77.5 |
| 3,078,239 | 2/1963 | Gmitter | 521/159 |
| 3,115,481 | 12/1963 | Pigott et al. | 260/77.5 |
| 3,741,917 | 6/1973 | Morehouse | 521/904 |
| 3,963,681 | 6/1976 | Kaneko et al. | 260/77.5 AM |
| 4,042,537 | 8/1977 | Dahm et al. | 260/2.5 AP |
| 4,042,540 | 8/1977 | Lammerting et al. | 521/904 |
| 4,054,545 | 10/1977 | Guillaume et al. | 521/904 |
| 4,089,835 | 5/1978 | König et al. | 260/31.6 |
| 4,120,834 | 10/1978 | Fatutto | 521/164 |
| 4,413,111 | 11/1983 | Markusch et al. | 528/59 |
| 4,452,924 | 6/1984 | Radovich | 521/129 |

OTHER PUBLICATIONS

"Silicone Surfactants for Urethane Foams", Dow Corning Corp. (Midland, Mich.).

Primary Examiner—Herbert S. Cockeram
Attorney, Agent, or Firm—Gene Harsh; Joseph C. Gil

[57] ABSTRACT

The present invention is directed to a process for the production of a flexible polyurethane foam comprising reacting (a) an organic polyisocyanate, and
(b) a coupled polyol which consists essentially of the reaction product of an organic polyisocyanate and an organic compound having a hydroxy functionality of at least 2 and a primary hydroxy group content of at least 30%, the ratio of hydroxyl groups in said organic compound to isocyanate groups being greater than 1,
(c) in the presence of
  (i) a blowing agent,
  (ii) a catalyst, and
  (iii) a foam stabilizer, said foam stabilizer being capable of producing a flexible polyurethane foam meeting the standard specifications for high resilience polyurethane foam as set forth in ASTM D-3770-79, when used in a foam formulation based on toluene diisocyanate and either (A) a polymer polyol prepared by polymerizing one or more ethylenically unsaturated monomers in a polyether polyol, or (B) a dispersion of polyurea and/or polyhydrazodicarbonamide in a hydroxyl group containing material.

5 Claims, No Drawings

FLEXIBLE POLYURETHANE FOAMS

BACKGROUND OF THE INVENTION

In the manufacture of high resilience polyurethane foam from toluene diisocyanate, it has generally been necessary to utilize as the polyol component either (i) polymer polyols prepared by polymerizing one or more ethylenically unsaturated monomers in a polyether polyol or (ii) dispersions of polyureas and/or polyhydrazodicarbonamides in hydroxyl group containing materials. The polymer polyols useful are known and are commercially available. Typical preparations of such polyols are disclosed in U.S. Pat. Nos. Re. 28,715 and Re. 29,118. Such polyols are commercially available from such companies as Bayer AG, Union Carbide and BASF. Similarly, the above-noted dispersions are known and are described, e.g. in U.S. Pat. Nos. 4,042,537 and 4,089,835. Such dispersions are commercially available from Mobay Chemical Corporation and Bayer AG. Specific types of foam stabilizers have been developed and are commercially available for the production of high resilience polyurethane foams from such materials.

Isocyanate coupled polyols are known and have been described in the art. The uses of such coupled polyols are varied and include raw materials for use in producing polyurethane elastomers (see, e.g., U.S. Pat. Nos. 3,115,481 and 3,963,681); warp-sizing agents, flocculating agents, films and fibers (see, e.g., U.S. Pat. No. 3,054,778); isocyanate terminated prepolymers for use in making foams (see, e.g., U.S. Pat. No. 3,078,239); polyurethane foams (see, e.g., U.S. Pat. No. 3,026,275); and, as a portion of the polyol used to produce polymer polyols (see, e.g., U.S. Pat. No. 4,357,430). The use of coupled polyols in improving the load bearing properties of flexible polyurethane foams is the subject of U.S. Pat. No. 4,452,924.

DESCRIPTION OF THE INVENTION

The present invention is directed to the discovery that coupled polyols can be used to produce flexible polyurethane foams using foam stabilizers of the type used to prepare high resilience polyurethane foams. Several benefits are obtained by such use. First, it is now possible to produce foams meeting the standard specifications for high resilience polyurethane foams as set forth in ASTM D3770-79 without the need of using polymer polyols or the above-described dispersions. It is now also possible to prepare flexible polyurethane foams (which may, if desired, be high resilience polyurethane foams) which can more easily pass small scale flammability tests such as the California Bulletin 117, Section A open flame test using little or no combustion modifiers. Furthermore, when compared to foams made from polymer polyols or the dispersions noted above, the foams of the present invention show increased foam hardness (e.g., 25% RIFD) and increased strength properties (e.g., tear and elongation).

More particularly, the present invention is directed to a process of preparing a flexible polyurethane foam and the foam so produced. The process comprises reacting:
(a) an organic polyisocyanate,
(b) a coupled polyol which consists essentially of the reaction product of an organic polyisocyanate and an organic compound having an hydroxy functionality of at least 2 and a primary hydroxy group content of at least 30% by weight (based on the weight of all the hydroxyl groups), the ratio of hydroxy groups in said organic compound to isocyanate groups being greater than 1,
(c) in the presence of
(i) a blowing agent,
(ii) a catalyst, and
(iii) a foam stabilizer, said foam stabilizer being capable of producing a flexible polyurethane foam meeting the standard specifications for high resilience polyurethane foam as set forth in ASTM D3770-79, when used in a foam formulation based on toluene diisocyanate and either (A) a polymer polyol prepared by polymerizing one or more ethylenically unsaturated monomers in a polyether polyol, or (B) a dispersion of polyurea and/or polyhydrazodicarbonamide in a hydroxyl group containing material.

In producing the coupled polyol herein, substantially any organic compound containing at least two hydroxyl groups can be used. Such compounds generally have molecular weights of from about 500 to about 12,000, preferably from about 1000 to about 8,000, and most preferably from about 1,500 to about 7,000. The functionality of the hydroxyl group containing compound is at least two and is preferably in excess of 2 and more preferably has an average functionality of from 2.5 to 8, and most preferably from 2.5 to no more than 4. At least 30% by weight, and preferably at least 50% by weight of the hydroxyl groups of the hydroxyl group containing compound are primary hydroxyl groups. Preferred compounds include polyesters, polyethers, polythioethers, polyacetals, polycarbonates and polyester amides containing an average of more than 2, and preferably from 2.5 to 4 hydroxyl groups.

Polyesters containing hydroxyl groups suitable for the present invention are reaction products of polyhydric alcohols with polybasic carboxylic acids. Instead of using the free polycarboxylic acids, it is also possible to use the corresponding polycarboxylic acid anhydrides or corresponding polycarboxylic acid esters of lower alcohols or mixtures thereof to produce the polyesters. The polycarboxylic acids may be aliphatic, cycloaliphatic, aromatic and/or heterocyclic and may optionally be substituted (for example by halogen atoms) and/or may be unsaturated.

Examples of suitable carboxylic acids and derivatives thereof are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrahydrophthalic acid anhydride, glutaric acid anhydride, maleic acid, maleic acid anhydride, fumaric acid, dimerized and trimerized unsaturated fatty acids (optionally in admixture with monomeric unsaturated fatty acids, such as oleic acid) terephthalic acid dimethyl ester and terephthalic acid-bis-glycol ester. Suitable polyhydric alcohols include: ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl-cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactone (for example ε-caprolactone) or of hydroxy carboxylic acids (for example ω-hydroxy caproic acid) may also be used.

The polyethers suitable for use in accordance with the present invention are known to those in the art. These polyethers may be obtained by polymerizing epoxides, such as ethylene oxide, propylene oxide, butylene oxide, tetrahydrofuran, styrene oxide, or epichlorohydrin in the presence of Lewis catalysts, such as $BF_3$. Polymerization may also be accomplished by the addition of epoxides (preferably ethylene oxide and propylene oxide) either in admixture or successively, to compounds containing reactive hydrogen atoms such as water, ammonia, alcohols or amines. Examples of such reactive hydrogen-containing compounds are ethylene glycol, 1,3-propylene glycol, 1,2-propylene glycol, trimethylol propane, glycerol, sorbitol, 4,4'-dihydroxy diphenyl propane, aniline, ethanolamine and ethylene diamine. Sucrose polyethers of the type described in German Auslegeschriften Nos. 1,176,358 and 1,064,938 and formitol or formose-started polyethers (German Offenlegungsschriften Nos. 2,639,083 and 2,737,951) may also be used in accordance with the present invention. In many cases, it is preferred to use polyethers which contain predominantly primary OH-groups (up to 90% by weight, based on all the OH-groups present in the polyether). Polybutadienes containing OH-groups are also suitable to the present invention.

Among the polythioethers which may be employed as the high molecular weight isocyanate reactive compounds, the condensation products of thiodiglycol on its own and/or with other glycols, dicarboxylic acids, formaldehyde, aminocarboxylic acids or amino alcohols are preferred. These condensation products include polythio mixed ethers, polythioether esters or polythioether ester amides.

Polyacetals which may be used in the present invention include the compounds obtained by reacting glycols (such as diethylene glycol, triethylene glycol, 4,4'-dioxethoxy diphenyl dimethyl methane and hexane diol) with formaldehyde. Other polyacetals suitable to the present invention may be obtained by polymerizing cyclic acetals, such as trioxane (German Offenlegungsschrift No. 1,694,128).

Suitable polycarbonates containing hydroxyl groups are known to those in the art. Such polycarbonates may be obtained by reacting diols (such as 1,3-propane diol, 1,4-butane diol and/or 1,6-hexane diol, diethylene glycol, triethylene glycol, tetraethylene glycol or thiodiglycol) with diaryl carbonates (for example diphenyl carbonate) or with phosgene (German Auslegeschriften Nos. 1,694,080; 1,915,908 and 2,221,751; German Offenlegungsschrift No. 2,605,024).

The polyester amides and polyamides suitable to the present invention include the predominantly linear condensates obtained from polybasic carboxylic acids or anhydrides thereof and polyhydric amino alcohols, diamines, higher polyamines and mixtures thereof.

Polyhydroxyl compounds containing urethane or urea groups, optionally modified natural polyols (such as castor oil), and carbohydrates (for example starch), may also be used as the isocyanate reactive compound of the present invention. Addition products of alkylene oxides with phenol/formaldehyde resins or with urea/formaldehyde resins may also be used.

The above-mentioned polyhydroxyl compounds may be modified in various ways. One such modification (described in German Offenlegungsschriften Nos. 2,210,839 (U.S. Pat. No. 3,849,515) and 2,544,195) is accomplished by etherification of a mixture of different polyhydroxyl compounds (for example, a polyether polyol and a polyester polyol) in the presence of a strong acid to form a relatively high molecular weight polyol which is made up of different segments attached through ether and ester bridges. Amide groups may be introduced into the polyhydroxyl compounds by the procedure disclosed in German Offenlegungsschrift No. 2,559,372. Triazine groups may be introduced in the polyhydroxyl compounds by reacting the polyhydroxyl compounds with polyfunctional cyanic acid esters (German Offenlegungsschrift No. 2,620,487). The reaction of a polyol with a less than equivalent quantity of a diisocyanato-carbodiimide, followed by reaction of the carbodiimide group with an amine, amide, phosphite or carboxylic acid, gives polyhydroxyl compounds containing guanidine, phosphonoformamide or acyl urea groups (German Offenlegungsschriften Nos. 2,714,289; 2,714,292 and 2,714,293).

According to the present invention, it is also possible to use polyhydroxyl compounds containing high molecular weight polyadducts and polycondensates or polymers in finely dispersed or dissolved form. Such polyhydroxyl compounds may be obtained by polyaddition reactions (for example, reactions between polyisocyanates and aminofunctional compounds), and polycondensation reactions (for example, between formaldehyde and phenols and/or amines) in situ in the above-mentioned compounds containing hydroxyl groups. Such processes are described in German Auslegeschriften Nos. 1,168,075; 1,260,142; and in German Offenlegungsschriften Nos. 2,324,134; 2,423,984; 2,512,385; 2,513,815; 2,550,796; 2,550,797; 2,550,833; 2,550,862; 2,633,293 and 2,639,254. It is also possible to obtain such a polyhydroxyl compound by mixing an aqueous polymer dispersion with a polyhydroxyl compound and subsequently removing the water from the mixture (U.S. Pat. No. 3,869,413 or German Offenlegungsschrift No. 2,550,860).

Polyhydroxyl compounds modified by vinyl polymers obtained by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (German Pat. No. 1,769,795; U.S. Pat. No. 3,637,909) are also suitable for use in the process according to the present invention. Plastics having particularly low combustibility are obtained by using polyether polyols modified by graft polymerization with vinyl phosphonic acid esters and, optionally, (meth-)acrylonitrile, (meth-)acrylamide or OH-functional (meth-)acrylic acid esters (German Offenlegungsschriften Nos. 2,442,101; 2,644,922 and 2,646,141). Polyhydroxyl compounds into which carboxyl groups have been introduced by radical graft polymerization with unsaturated carboxylic acids and, optionally, other olefinically unsaturated monomers (German Offenlegungsschriften Nos. 2,714,291; 2,739,620 and 2,654,746) are particularly advantageous when used in combination with mineral fillers.

Representatives of the above-mentioned isocyanate-reactive compounds suitable to the present invention are described in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5–6 and 198–199, and in Kunststoff- Handbuch, Vol. VII, Vieweg-Hochtlen, Carl Hanser Verlag, Munich, 1966, for example on pages 45 to 71. It is, of course, possible to use mixtures of the above-mentioned compounds.

In producing the coupled polyols of the present invention, substantially any organic polyisocyanate may be used. Aliphatic, cycloaliphatic, araliphatic, aromatic and heterocyclic polyisocyanates may be used. Examples of suitable polyisocyanates are described by W. Siefken in Justus Liebigs Annalen der Chemie, 562, pages 75 to 136. Among the polyisocyanates described therein are those corresponding to the general formula $$Q(NCO)_n$$

wherein n represents 2-4, preferably 2; and

Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms; or an araliphatic hydrocarbon radical containing from 8 to 15 (preferably from 8 to 13) carbon atoms.

Examples of compounds corresponding to this formula are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane (German Auslegeschrift No. 1,202,785, U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; and naphthylene-1,5-diisocyanate.

Other examples of suitable polyisocyanates are: triphenyl methane-4,4',4''-triisocyanate, polyphenyl polymethylene polyisocyanates of the type obtained by condensing aniline with formaldehyde followed by phosgenation (described in British Pat. Nos. 874,430 and 848,671); m- and p-isocyanatophenyl sulfonyl isocyanates (U.S. Pat. No. 3,277,138); polyisocyanates containing carbodiimide groups (German Pat. No. 1,092,007 (U.S. Pat. No. 3,152,162) and German Offenlegungsschriften Nos. 2,504,400; 2,537,685 and 2,552,350); norbornane diisocyanates (U.S. Pat. No. 3,492,330) polyisocyanates containing allophanate groups (British Pat. No. 994,890, Belgian Pat. No. 761,626 and Dutch patent application No. 7,102,524); polyisocyanates containing isocyanurate groups (U.S. Pat. No. 3,001,973); German Pat. Nos. 1,022,789; 1,222,067 and 1,027,394 and German Offenlegungsschriften Nos. 1,929,034 and 2,004,048); polyisocyanates containing urethane groups (Belgian Pat. No. 752,261, U.S. Pat. Nos. 3,394,164 and 3,644,457); polyisocyanates containing acylated urea groups (German Pat. No. 1,230,778); polyisocyanates containing biuret groups (U.S. Pat. Nos. 3,124,605 and 3,201,372, British Pat. No. 889,050); polyisocyanates produced by telomerization reactions (U.S. Pat. No. 3,654,106); polyisocyanates containing ester groups (British Pat. Nos. 965,474 and 1,072,956, U.S. Pat. No. 3,567,763 and German Pat. No. 1,231,688); reaction products of the above-mentioned diisocyanates with acetals (German Pat. No. 1,072,385) and polyisocyanates containing polymeric fatty acid esters (U.S. Pat. No. 3,455,883). It is also possible to use the isocyanate group-containing distillation residues obtained in the commercial production of isocyanates, optionally in solution in one or more of the above-mentioned polyisocyanates. It is also possible to use mixtures of the above-mentioned polyisocyanates.

It is generally preferred that the commercially available polyisocyanates be used in the present invention. Such readily available materials include 2,4- and 2,6-tolylene diisocyanate, also mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates").

The coupled polyols can be produced by adding the isocyanate to the polyol with agitation. The choice of reaction conditions is primarily a function of the reaction time desired. The use of elevated temperatures and the addition of catalysts known in the art to promote urethane formation (e.g., dibutyltin dilaurate) are beneficial for decreasing the reaction time. Reaction temperatures of 50° to 100° C. at dibutyltin dilaurate levels of from 100 to 200 parts per million are generally satisfactory for completion of the reaction in a one to four hour time period. The temperature is generally held at the elevated point until all of the isocyanate has reacted. Coupled polyols that are suitable for the present invention can be produced by using either batch or continuous production methods.

In producing the coupled polyol, the ratio of hydroxyl groups to isocyanate groups must be greater than 1. It is generally desirable to utilize an amount of polyisocyanate in relation to the polyol (described as isocyanate index, which is defined as $$\frac{\text{Equivalents of NCO}}{\text{Equivalents of OH}} \times 100$$

to avoid the presence of free isocyanate groups. The polyol should thus be present in an amount sufficient to provide an excess of hydroxyl groups. The upper limit will generally be determined by the viscosity level which can be tolerated.

In general, the isocyanate index will be as low as 10 up to the index at which "gel" occurs. Gelation marks the division of the mixture into two parts: the gel, which is insoluble in all nondegrading solvents, and the sol, which remains soluble and can be extracted from the gel. Preferably the isocyanate index is no higher than that which will yield a coupled polyol of about 100,000 cps.

In preparing the foams of the present invention, the coupled polyol is reacted with an organic polyisocyanate in the presence of a blowing agent, a catalyst and a foam stabilizer. The isocyanates useful include all of those noted above. Although not preferred, the coupled polyol can be blended with any of the polyols noted above in substantially any blending ratio. The amount of uncoupled polyol can thus range from 0 to 95 percent by weight, and preferably from 20 to 80 percent by weight, based on the total weight of coupled polyol and uncoupled polyol.

As noted earlier, the foam stabilizers used in the present invention are those which are capable of producing a flexible polyurethane foam meeting the standard specifications for high resilience polyurethane foam as set forth in ASTM D3770-79 when such stabilizer is used in a formulation based on toluene diisocyanate and either a polymer polyol or a dispersion of the type mentioned earlier. ASTM D3770-79 sets forth the physical properties of high resilience polyurethane foam as set forth in the following TABLE 1.

TABLE 1

| Physical Property | ASTM Test Method D3574 Sections | Specimen Size mm. | Foam Grade HR-I | Foam Grade HR-II |
|---|---|---|---|---|
| Indentation Force Deflection at 25%, IFD. N (lbf) | 12–18 | 380 × 380 × 100 | ≦67 (15) | >67 (15) |
| Density, min. kg/m$^3$ (lb/ft$^3$) | 6–11 | 50 × 50 × 25 | 24 (1.5) | 40 (2.5) |
| Resilience, mm. % ball rebound | 59–66 | 100 × 100 × 50 | 60 | 60 |
| Support Factor 65% IFD/25% IFD. min. | 12–18 | 380 × 380 × 100 | 2.4 | 2.4 |
| Recovery Ratio 25% R/25% IFD. min. % | 12–18 | 380 × 380 × 100 | 75 | 80 |
| Tensile Strength, min. kPa (psi) | 38–44 | Die shown in FIG. 3 of D3574 | 50 (7) | 70 (10) |
| Elongation, min. % | 38–44 | Die shown in FIG. 3 of D3574 | 100 | 100 |
| Tear Strength, mm. N/m (lbf/in) | 45–51 | Specimen shown in FIG. 2 of D3574 | 175 (1) | 175 (1) |
| Compression Set, C | 31–37 | | | |
| Max. 50% | | | 15 | ... |
| Max. 75% | | | ... | 10 |
| Static Fatigue | 67–75 | 380 × 380 × 100 | | |
| loss of thickness, max % | | | —. | 2 |
| loss in force deflection at 25% IFD, max. % | | | —. | 20 |
| Moisture Resistance | 83–87 | 50 × 50 × 25 | | |
| Compression force deflection loss, max. % | Procedure J | | 20 | 20 |
| Constant deflection compression set, max. % (75% deflection) | | | 15 | 15 |

Suitable stabilizers are known in the art, are commercially available and are sold by the various manufacturers as being useful in the preparation of high resilience polyurethane foam. Specific examples include foam stabilizers available from Goldschmidt, e.g., those sold as Tegostab B4113, Tegostab B4690, Tegostab B4351, Tegostab B4380, Tegostab B4617, and Tegostab UB5063; foam stabilizers available from Union Carbide, e.g. those sold as L5303, L5305, L5306, L5307 and L5309; and foam stabilizers available from Dow Corning, e.g., those sold as XF1-1630, Q2-5043, Q2-5164 and X2-5092. Of course any foam stabilizer which is capable of producing a flexible foam meeting the standard specification for high-resilience polyurethane foam as set forth in ASTM D3770-79 when using a formulation based on toluene diisocyanate and either a polymer polyol or a dispersion of the type mentioned earlier, can be used.

Suitable blowing agents include water and/or readily volatile inorganic or organic substances. Appropriate organic blowing agents are acetone, ethyl acetate, halogen-substituted alkanes, such as methylene chloride, chloroform, ethylidene chloride, vinylidene chloride, monofluorotrichloromethane, chlorodifluoromethane, dichlorodifluoromethane; and butane, hexane, heptane or diethyl ethers. Inorganic blowing agents which may be used are air, $CO_2$ and $N_2O$. A blowing effect may also be achieved by adding compounds which decompose at the reaction temperature to give off a gas (e.g., nitrogen, given off by azo compounds, such as azodicarbonamide or azobutyronitrile). Other examples of blowing agents and information on the use of blowing agents may be found in Kunststoff-Handbuch, Vol. VII, by Vieweg and Hochtlen, Carl-Hanser-Verlag, Munich, 1966, for example on pages 108 and 109, 453 to 455 and 507 to 510.

Catalysts known in the art are also used in the practice of the present invention. Among these catalysts are tertiary amines such as triethylamine; tributylamine; N-methyl morpholine; morpholine: N,N,N',N'-tetramethyl ethylene diamine; pentamethyl diethylene triamine and higher homologues (German Offenlegungsschriften Nos. 2,624,527 and 2,624,528); 1,4-diazabicyclo-(2,2,2)octane: N-methyl-N'-dimethylamino-methyl piperidine; bis(dimethylaminoalkyl) piperazines (German Offenlegungsschrift No. 2,636,787); N,N-dimethyl benzylamine; N,N-dimethyl cyclohexylamine; N,N-diethyl benzylamine; bis(N,N-diethylaminoethyl)-adipate; N,N,N',N'-tetramethyl-1,3-butane diamine; N,N-dimethyl-β-phenyl ethylamine; 1,2-dimethylimidazole; 2-methylimidazole; monocyclic and bicyclic amidines (German Offenlegungsschrift No. 1,720,633); bis-(dialkylamino)-alkyl ethers (U.S. Pat. No. 3,330,782, German Auslegeschrift No. 1,030,558, German Offenlegungsschriften Nos. 1,804,361 and 2,618,280); and tertiary amines containing amide groups (preferably formamide groups) according to German Offenlegungsschriften Nos. 2,523,633 and 2,732,292. Other suitable catalysts are also Mannich bases of secondary amines (such as dimethylamine), aldehydes (preferably formaldehyde), ketones (such as acetone, methylethyl ketone and cyclohexanone) and phenols (such as phenol, nonyl phenol or bisphenol).

Tertiary amines containing isocyanate-reactive hydrogen atoms suitable for use as catalysts are triethanolamine, triisopropanolamine, N-methyl-diethanolamine, N-ethyl-diethanolamine, N,N-dimethylethanolamine, the reaction products thereof with alkylene oxides (such as propylene oxide and/or ethylene oxide), and also secondary-tertiary amines according to German Offenlegungsschrift No. 2,732,292.

Other suitable addition catalysts are sila-amines containing carbon-silicon bonds of the type described in German Pat. No. 1,229,290 (corresponds to U.S. Pat. No. 3,620,984). Examples of these compounds are 2,2,4-trimethyl-2-silamorpholine and 1,3-diethylaminomethyl tetramethyl disiloxane.

Other catalysts which may be used in the present invention include: nitrogen-containing bases (such as tetraalkyl ammonium hydroxides), alkali metal hydroxides, (such as sodium hydroxide), alkali metal phenolates (such as sodium phenolate) and alkali metal alcoholates (such as sodium methylate). Hexahydrotriazines may also be used as catalysts (German Offenlegungsschrift No. 1,769,043).

The reaction between NCO-groups and Zerewitinoff-active hydrogen atoms may also be greatly accelerated by use of lactams and azalactams which are believed to form a complex with the compound containing acid hydrogen. Such complexes and their catalytic effect are described in German Offenlegungsschrift Nos. 2,062,288; 2,062,289; 2,117,576 (U.S. Pat. No. 3,758,442); 2,129,198; 2,330,175 and 2,330,211.

Organometallic compounds, particularly organo-tin compounds may also be used as catalysts in the present invention. In addition to sulfur-containing compounds such as di-n-octyl tin mercaptide (German Auslegeschrift No. 1,769,367; U.S. Pat. No. 3,654,927), preferred organo-tin compounds are tin (II) salts of carboxylic acids such as tin (II) acetate, tin (II) octoate, tin (II) ethyl hexoate and tin (II) laurate, and tin (IV) compounds, for example, dibutyl tin oxide, dibutyl tin dichloride, dibutyl tin diacetate, dibutyl tin dilaurate, dibutyl tin maleate and dioctyl tin diacetate.

The above-mentioned catalysts may also be used in the form of mixtures. Combinations of organometallic compounds and amidines, aminopyridines or hydrazino pyridines (German Offenlegungsschriften Nos. 2,434,185; 2,601,082 and 2,603,834) are particularly advantageous.

Additional catalysts which may be used in accordance with the present invention may be found in Kunststoff-Handbuch by Vieweg and Hochtlen, Vol. VII, Carl-Hanser-Verlag, Munich, 1966, for example on pages 96 to 102. The additional catalysts are generally used in a quantity of from about 0.001 to 10% by weight, (based on the total quantity of compounds containing at least two isocyanate-reactive hydrogen atoms).

Reaction retarders (e.g., acid-reacting substances such as hydrochloric acid or organic acid halides), cell regulators (such as paraffins or fatty alcohols or dimethyl polysiloxanes), pigments, dyes, known flameproofing agents (for example trischloroethyl phosphate, tricresyl phosphate or ammonium phosphate and polyphosphate), stabilizers against the effects of ageing and weather, plasticizers, fungistatic and bacteriostatic substances, and fillers (such as barium sulphate, kieselguhr, carbon black or whiting) may also be used in the practice of the present invention.

Additional examples of surface-active additives, cell regulators, reaction retarders, flame-proofing agents, plasticizers, dyes, fillers, fungistatic and bacteriostatic substances which may optionally be used in the present invention and information on the way in which these additives may be used may be found in Kunststoff-Handbuch, by Vieweg and Hochtlen, Vol VII, Carl-Hanser-Verlag, Munich, 1966, for example on pages 103 to 113.

The process of the present invention may be carried out by techniques well known to those in the art. These known methods include reacting the starting materials by the one-shot process. Suitable apparatuses are described in U.S. Pat. No. 2,764,565. Particulars of processing machines may also be found in Kunststoff-Handbuch by Vieweg and Hochtlen, Vol. VII, Carl-Hanser-Verlag, Munich, 1966, for example on pages 121 to 205.

Foams may be made in accordance with the present invention by introducing the foamable reaction mixture into a closed mold. Suitable mold materials are metals (for example, aluminum) or plastics (for example, epoxide resin). The foamable reaction mixture foams in the mold and forms the molding. In-mold foaming may be carried out in such a way that the molding has either a cellular structure at its surface, or a compact skin and a cellular core. The foamable reaction mixture may be introduced into the mold in such a quantity that the foam formed just fills the mold. However, it is also possible to introduce more foamable reaction mixture than is required to fill the interior of the mold with foam. This latter technique is known as "overcharging" and is described in U.S. Pat. Nos. 3,178,490 and 3,182,104. In many cases known "external release agents" (such as silicone oils) are used for in-mold foaming. However, it is also possible to use so-called "internal release agents", optionally in admixture with external release agents, of the type described in German Offenlegungsschriften Nos. 2,121,670 and 2,307,589.

According to the present invention, it is also possible to produce cold-hardening foams (cf. British Pat. No. 1,162,517 and German Offenlegungsschrift No. 2,153,086). Foams may also be produced by block foaming.

The products of the present invention may be used as upholstery material, cushioning, carpet underlay and mattresses.

The invention is further illustrated, but is not intended to be limited by the following examples in which all parts and percentages are by weight unless otherwise specified.

EXAMPLES

In the examples which follow, the following polyols were used:

(a) POLYOL A: is a glycerine initiated propylene oxide/ethylene oxide polyether (weight ratio of propylene oxide to ethylene oxide is about 6:1) of OH number 35, molecular weight of 4800, functionality of 3, and containing about 80 to 85% primary OH groups.

(b) POLYOL B: is a glycerine initiated propylene oxide/ethylene oxide polyether (weight ratio of propylene oxide to ethylene oxide is about 9:1) of OH number 46, molecular weight of 3660, functionality of 3, and containing about 50 to 60% primary OH groups.

In the examples which follow, the following isocyanates were used:

(a) ISO A: toluene diisocyanate containing about 80% of the 2,4-isomer and about 20% of the 2,6-isomer.

(b) ISO B: 4,4'-diphenylmethane diisocyanate.

In the examples which follow, the following additional materials were used as indicated:

(1) $H_2O$: water (2) DEOA-LF: an 85% solution of diethanolamine in water (3) TEOA: triethanolamine (4) P7750: Polycat 7750, a commercially available tertiary amine available from Abbott Laboratories (5) 33LV: triethylene diamine (33%) in dipropylene glycol (6) T-12: dibutyltin dilaurate (7) L5307: a commercially available high resilience foam stabilizer from Union Carbide.

(8) Q2-5164: a commercially available high resilience foam stabilizer from Dow Corning.

(9) T101: Thermolin 101, a commercially available flame retardant from Olin Chemical.

The procedure which follows was used to produce all of the coupled polyols in all of the examples.

100 parts of the polyol were charged to a reactor equipped with a motor driven agitator and having heating and cooling capabilities. Dibutyltindilaurate catalyst (in an amount of 0.01 parts by weight) was added to the polyol and the contents of the reactor were heated to a temperature of 80°-85° C. The isocyanate was then charged to the reactor while maintaining a reaction temperature of 80°-85° C. A nitrogen atmosphere was maintained in the vessel during the reaction. After a 2 hour reaction time, no unreacted isocyanate groups were detectable by infrared spectroscopic analysis. The product was then cooled and removed from the reactor. The type and amount of isocyanate used (in parts by weight), the index used to make the coupled polyol, the polyol used to make the coupled polyol, the OH number of the coupled polyol and the viscosity of the coupled polyol were as indicated in TABLE 2.

In Examples 1 through 6, the foams were produced using the following foam formulations:

| Component | Parts by Weight |
| --- | --- |
| Coupled polyol | 100 |
| ISO A | Variable (see TABLE 3) |
| H$_2$O | 2.2 |
| P7750 | 0.08 |
| 33LV | 0.12 |
| T-12 | 0.1 |
| L5307 | 1.0 |
| T101 | 2.0 |

In each example, the isocyanate index of the foam formulation was 115. The physical property test results were as indicated in TABLE 3.

TABLE 3

| Ex. ample | Coupled Polyol Used | PBW ISO A | IFD, 25% R | Density pcf | Rise Time (minutes) | Comments |
| --- | --- | --- | --- | --- | --- | --- |
| 1 | 4 | 28.9 | 39 | 2.47 | 2:18 | good processing |
| 2 | 2 | 30.0 | 47 | 2.59 | 2:33 | good processing |
| 3 | 3 | 29.5 | 43 | 2.57 | 2:22 | good processing |
| 4 | 8 | 30.5 | 51 | 2.77 | 2:48 | good processing |
| 5 | 5 | 28.4 | 39 | 2.55 | 1:55 | good processing |
| 6 | 7 | 29.0 | 41 | 2.57 | 2:30 | good processing |

MACHINE MIX EXAMPLES (7 THROUGH 26)

Production-scale runs were made on a Hennecke UBT-65 machine under the following conditions:

| Mixer type | Pin |
| --- | --- |

TABLE 2

| Coupled Polyol | Base Polyol Used | Isocyanate Used | PBW Isocyanate | NCO/OH Index | cps @ 25° C. Viscosity of Coupled Polyol | OH Number of Coupled Polyol |
| --- | --- | --- | --- | --- | --- | --- |
| 1 | A | ISO A | 0.41 | 7.5 | 1460 | 32 |
| 2 | A | ISO A | 0.82 | 15 | 1960 | 30 |
| 3 | A | ISO A | 1.20 | 22 | 3120 | 27 |
| 4 | A | ISO A | 1.63 | 30 | 5975 | 24 |
| 5 | A | ISO A | 2.18 | 40 | 14400 | 21 |
| 6 | A | ISO A | 2.73 | 50 | 72000 | 17 |
| 7 | A | ISO B | 2.34 | 30 | 7440 | 24 |
| 8 | B | ISO A | 2.19 | 30 | 5040 | 32 |

HAND MIX EXAMPLES (1 THROUGH 6)

Box pour foams (13"×13", free rise) were prepared for each coupled polyol investigated. The polyol components, (polyol, water, amine catalyst, tin catalyst and silicone surfactant) were pre-mixed for 15 seconds at 1500 RPM. The addition of the isocyanate was followed by a 5 second mix at 2000 RPM. The mixture was poured into a cardboard box. After allowing the foams to cure for 24 hours, a 11"×11"×3" pad was cut from the center of the bun and used for physical testing.

| Mixer speed, RPM | 3500 |
| --- | --- |
| Throughput, lb/min | 110-120 |
| Polyol/TDI Temperature, °F. | 75/75 |

A 40"×100"×18" high bun was produced and allowed to cure for 24 hours prior to cutting. A cross-section 15" wide was cut from the center of the bun and used for physical property testing.

The formulations used were as indicated in TABLE 4, while the physical properties obtained were as set forth in TABLE 5.

TABLE 4

| Example Number | Coupled Polyol 4 | ISO A | Foam Index | H$_2$O | DEOA-LF | TEOA | P7750 | 33LV | T12 | L5307 | Q2-5164 | T101 |
| --- | --- | --- | --- | --- | --- | --- | --- | --- | --- | --- | --- | --- |
| 7 | 100 | 24.6 | 115 | 1.8 | — | — | 0.08 | 0.12 | 0.10 | 1.0 | — | 2.0 |
| 8 | 100 | 24.6 | 115 | 1.8 | — | — | 0.08 | 0.12 | 0.10 | 1.0 | — | 2.0 |
| 9 | 100 | 29.0 | 115 | 2.2 | — | — | 0.08 | 0.12 | 0.10 | 1.0 | — | 2.0 |
| 10 | 100 | 26.5 | 105 | 2.2 | — | — | 0.08 | 0.12 | 0.10 | 1.0 | — | 2.0 |
| 11 | 100 | 41.6 | 110 | 3.5 | — | — | 0.06 | 0.09 | 0.15 | 3.0 | — | 3.0 |
| 12 | 100 | 41.6 | 110 | 3.5 | — | — | 0.06 | 0.09 | 0.15 | — | 2.0 | 3.0 |
| 13 | 100 | 44.8 | 105 | 4.0 | — | — | 0.06 | 0.09 | 0.15 | — | 2.0 | 3.0 |
| 14 | 100 | 44.8 | 105 | 4.0 | — | — | 0.06 | 0.09 | 0.15 | — | — | — |

TABLE 4-continued

| Example Number | Coupled Polyol 4 | ISO A | Foam Index | H₂O | DEOA-LF | TEOA | P7750 | 33LV | T12 | L5307 | Q2-5164 | T101 |
|---|---|---|---|---|---|---|---|---|---|---|---|---|
| 15 | 100 | 52.0 | 105 | 4.7 | — | — | 0.06 | 0.09 | 0.15 | — | 2.0 | 3.0 |
| 16 | 100 | 30.3 | 115 | 2.2 | — | 0.6 | 0.08 | 0.12 | 0.10 | 1.0 | — | 2.0 |
| 17 | 100 | 31.2 | 115 | 2.2 | — | 1.0 | 0.16 | 0.24 | 0.10 | 1.0 | — | 2.0 |
| 18 | 100 | 31.2 | 115 | 2.2 | — | 1.0 | 0.16 | 0.24 | 0.10 | 1.0 | — | 2.0 |
| 19 | 100 | 28.4 | 105 | 2.2 | — | 1.0 | 0.16 | 0.24 | 0.10 | 1.0 | — | 2.0 |
| 20 | 100 | 30.3 | 115 | 2.2 | — | 0.6 | 0.14 | 0.21 | 0.10 | 1.0 | — | 2.0 |
| 21 | 100 | 30.3 | 115 | 2.3 | — | 0.6 | 0.14 | 0.21 | 0.10 | 1.0 | — | 2.0 |
| 22 | 100 | 43.6 | 110 | 3.5 | — | 1.0 | 0.06 | 0.09 | 0.10 | 2.0 | — | 3.0 |
| 23 | 100 | 45.6 | 115 | 3.5 | — | 1.0 | 0.06 | 0.09 | 0.10 | 2.0 | — | 3.0 |
| 24 | 100 | 30.0 | 115 | 2.2 | 0.4 | — | 0.08 | 0.12 | 0.10 | 1.0 | — | 2.0 |
| 25 | 100 | 27.4 | 105 | 2.2 | 0.4 | — | 0.08 | 0.12 | 0.10 | 1.0 | — | 2.0 |
| 26 | 100 | 30.5 | 115 | 2.2 | 0.6 | — | 0.08 | 0.12 | 0.10 | 1.0 | — | 2.0 |

All parts in Table 4 are by weight.

TABLE 5

| Example # | Density | IFD. 25% R | SAG | Tensile | Tear | Elongation | Air Flow | Ball Rebound | Combustion Properties CAL 117A Burn Length | CAL 117D % Non-smold |
|---|---|---|---|---|---|---|---|---|---|---|
| 7 | 2.82 | 37 | 2.30 | 20 | 3.9 | 366 | 0.34 | 41 | 1.6 | 97.9 |
| 8 | 3.01 | 52 | 2.19 | 17 | 2.5 | 248 | NT | 40 | NT | NT |
| 9 | 2.44 | 40 | 2.16 | 22 | 4.0 | 325 | 0.36 | 40 | 1.8 | 98.9 |
| 10 | 2.65 | 42 | 2.16 | 19 | 3.4 | 298 | NT | 41 | NT | NT |
| 11 | 1.71 | 41 | 1.98 | 18 | 3.1 | 267 | 0.39 | 34 | 2.5 | 99.5 |
| 12 | 1.65 | 40 | 2.05 | 20 | 3.5 | 321 | 0.38 | 23 | 2.6 | 99.6 |
| 13 | 1.48 | 36 | 2.12 | 20 | 4.2 | 343 | 0.40 | 18 | 2.4 | 99.5 |
| 14 | 1.48 | 37 | 2.04 | 22 | 3.9 | 314 | 0.44 | 23 | FAIL | 99.4 |
| 15 | 1.32 | 38 | 2.15 | 16 | 3.9 | 286 | 0.46 | 23 | 3.8 | 99.5 |
| 16 | 2.50 | 41 | 2.22 | 17 | 2.2 | 228 | 0.40 | 41 | NT | NT |
| 17 | 2.46 | 37 | 2.30 | 12 | 1.2 | 167 | 0.24 | 51 | 1.66 | 99.1 |
| 18 | 2.36 | 21 | 2.50 | 11 | 1.1 | 183 | 0.40 | 41 | NT | NT |
| 19 | 2.35 | 17 | 2.61 | 10 | 1.4 | 197 | 0.60 | 44 | NT | NT |
| 20 | 2.47 | 29 | 2.34 | 11 | 1.1 | 159 | 0.32 | 49 | NT | NT |
| 21 | 2.43 | 34 | 2.26 | 14 | 1.3 | 168 | 0.37 | 36 | NT | NT |
| 22 | NT | NT | NT | NT | NT | NT | NT | NT | NT | NT |
| 23 | NT | NT | NT | NT | NT | NT | NT | NT | NT | NT |
| 24 | 2.25 | 32 | 2.18 | 13 | 2.1 | 234 | NT | 51 | NT | NT |
| 25 | 2.38 | 25 | 2.29 | 13 | 2.6 | 251 | NT | 49 | NT | NT |
| 26 | 2.20 | 28 | 2.27 | 12 | 1.4 | 200 | NT | 53 | NT | NT |

NT = not tested

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a flexible polyurethane foam comprising reacting
    (a) an organic polyisocyanate, and
    (b) a coupled polyol which consists essentially of the reaction product of an organic polyisocyanate and an organic compound having an hydroxy functionality of at least 2 and a primary hydroxy group content of at least 30%, the ratio of hydroxyl groups in said organic compound to isocyanate groups being greater than 1,
    (c) in the presence of
        (i) a blowing agent,
        (ii) a catalyst, and
        (iii) a foam stabilizer, said foam stabilizer being capable of producing a flexible polyurethane foam meeting the standard specifications for high resilience polyurethane foam as set forth in ASTM D-3770-79, when used in a foam formulation based on toluene diisocyanate and either (A) a polymer polyol prepared by polymerizing one or more ethylenically unsaturated monomers in a polyether polyol, or (B) a dispersion of polyurea and/or polyhydrazodicarbonamide in an hydroxyl group containing material.

2. The process of claim 1 wherein said organic compound has a functionality of from 2.5 to 4 and a primary hydroxyl group content of at least 50%.

3. The process of claim 1, wherein said organic compound is a polyether.

4. A polyurethane foam produced according to the process of claim 1.

5. The process of claim 1 wherein said organic compound has a molecular weight of from about 500 to 12,000.

* * * * *